(12) United States Patent
Adey

(10) Patent No.: US 7,726,492 B2
(45) Date of Patent: Jun. 1, 2010

(54) SEPARATOR DEVICE

(76) Inventor: Christopher Adey, 1 Corfe Close, Prestbury, Cheltenham, Glos (GB) GL52 5BX ( * ) Notice: Subject to any disclaimer, the term of this patent is extended or adjusted under 35 U.S.C. 154(b) by 635 days.

(21) Appl. No.: 10/558,345

(22) PCT Filed: May 25, 2004

(86) PCT No.: PCT/GB2004/002243
§ 371 (c)(1), (2), (4) Date: Aug. 15, 2006

(87) PCT Pub. No.: WO2004/105954
PCT Pub. Date: Dec. 9, 2004

(65) Prior Publication Data
US 2006/0283783 A1    Dec. 21, 2006

(30) Foreign Application Priority Data

| May 29, 2003 | (GB) | 0312266.0 |
| Sep. 23, 2003 | (GB) | 0322214.8 |
| Nov. 28, 2003 | (GB) | 0327644.1 |
| Jan. 29, 2004 | (GB) | 0401873.5 |

(51) Int. Cl.
*B03C 1/30* (2006.01)

(52) U.S. Cl. ......... 209/39; 209/231; 209/232; 251/216; 251/227

(58) Field of Classification Search ......... 209/231, 209/232; 251/216, 227
See application file for complete search history.

(56) References Cited

U.S. PATENT DOCUMENTS

| 1,679,898 | A | * | 8/1928 | Gilbert | 137/243.2 |
| 2,029,202 | A | * | 1/1936 | Shepherd | 137/244 |
| 2,046,228 | A | * | 6/1936 | Wiedmann et al. | 137/517 |
| 4,479,511 | A | * | 10/1984 | Holland | 137/614.2 |
| 4,524,800 | A | * | 6/1985 | Holland | 137/516.27 |
| 4,554,940 | A | * | 11/1985 | Loup | 137/115.15 |
| 4,834,140 | A | * | 5/1989 | Schmidt | 137/614.17 |
| 5,562,188 | A | * | 10/1996 | Appelgren | 188/352 |
| 6,357,465 | B1 | * | 3/2002 | Caldwell et al. | 137/71 |
| 2002/0096464 | A1 | | 7/2002 | Simonson | |

FOREIGN PATENT DOCUMENTS

| EP | 0 890 552 | 1/1999 |
| GB | 2 072 807 | 10/1981 |

* cited by examiner

*Primary Examiner*—Patrick Mackey
*Assistant Examiner*—Terrell H Matthews
(74) *Attorney, Agent, or Firm*—Skinner and Associates

(57) ABSTRACT

A separator device comprising a housing having an inlet and an outlet, a magnetic separator rod or element being located within the housing to collect and separate from the flow of fluid through the housing magnetic particles carried by the flow of fluid.

2 Claims, 5 Drawing Sheets

SEPARATOR DEVICE

This invention relates to a separator device suitable for use in, for example, a heating system for use in the separation of solid particles from fluids, for example the separation of ferrous particles from a flow of a fluid. However it may find application in a range of other positions. It also relates to an inlet device suitable for use with such a separator device.

A conventional wet heating system comprises a series of radiators to which hot water is supplied through pipes from a suitable source, for example a gas, oil or electrically powered boiler or heater. Over time, the oxygen contained within the water causes corrosion of the inner surfaces of the pipes, radiators or the like. Such corrosion results in the water carrying with it ferrous particles sometimes referred to as magnetite. The magnetite tends to build up over time causing a number of problems. For example the magnetite may form a restriction to fluid flow resulting in poor circulation causing cold spots. Further, the heating system will typically become of reduced efficiency and may also operate noisily.

It is known to add corrosion inhibiting materials to the water contained in heating systems to reduce these problems. However the use of such inhibitors tends to slow or delay the onset of the problems rather than remove them. Further, the addition of inhibitors is often inconvenient and may require the addition of a specific inhibitor inlet device to the system to allow the inhibitor to be added.

Similar problems are common in some air conditioning systems where cooling water is supplied through steel pipework to cooling towers or the like.

FR 2793427, GB 522294, and US 2002/0096464 all describe magnetic separator devices. In each case, a housing is provided, the housing having an inlet and an outlet to allow liquid to be supplied to and from the housing. A separator element in the form of a magnetic rod is located within or partially within the housing. In use, ferrous particles carried into the housing with the liquid tend to collect on the magnetic rod such that the liquid leaving the housing is substantially free of ferrous particles.

EP 1252932, EP 1076601 and WO 97/04873 all describe a magnetic separator device similar, in many respects, to the arrangements described hereinbefore, but in which annular plates are provided adjacent magnetic elements forming the magnetic rod, the outer parts of the annular plates serving as pole pieces which assist in collection of ferrous materials. The presence of the annular plates makes cleaning of this type of arrangement very difficult.

An object of the invention is to provide a separator to allow the removal of ferrous particles from a flow of fluid to obviate these problems, in a simple and convenient form.

According to the present invention there is provided a separator device comprising a housing having an inlet and an outlet, a magnetic element being located within the housing to collect and separate from a flow of fluid through the housing ferrous particles carried by the fluid, wherein the housing is provided with an air bleed device.

The provision of an air bleed device is advantageous in that, if the housing is opened to allow the removal of ferrous particles collected thereby, a quantity of air may be introduced into the system in which the device is located. The provision of the air bleed device allows such air to be easily and safely removed from the system.

The air bleed device may comprise a screw threaded component engageable with a seating to close a passage, movement of the component from its seating allowing air to escape from the housing.

Alternatively, the air bleed device may be adapted to additionally allow the introduction of, for example, chemicals, into the system. One form of such air bleed device comprises an inlet device in the form of an externally threaded bolt defining a passage, a seating surrounding part of the passage, a valve member being spring biassed towards the seating to close the passage. The valve member, when engaging the seating, substantially prevents the escape of fluid from the system. When an inhibitor or other fluid is to be added, a suitable applicator supplies the inhibitor or other fluid to the passage at a sufficient pressure to urge the valve member away from the seating, thereby allowing the inhibitor or other fluid to enter the heating system.

The passage may include a screw-threaded region receiving a plug to seal the passage, and thereby further prevent the escape of fluid from the system when this is not desired. In use, when inhibitor or another fluid is to be added to the system, the plug can be removed.

The plug is preferably shaped so as to engage and lift the valve member from its seating, when fully introduced into the passage, so that release of the plug by a small amount allows fluid, for example air, to be bled from the system.

The air bleed device may be used to secure parts of the separator to one another.

The inlet and outlet are conveniently spaced apart in the axial direction of the housing. By having the outlet and inlet spaced apart in this manner, water or other fluid flowing through the housing from the inlet to the outlet will flow over at least part of the length of the magnetic element with the result that ferrous particles are collected in an efficient manner by the magnetic element.

Conveniently, the inlet and outlet are spaced apart by a distance greater than approximately 50% of the length of the magnetic element.

The inlet and outlet are conveniently configured to generate a swirling motion in the fluid passing through the housing.

The separator may be located in a heating system, for example in the pipework connecting the radiators and boiler. Alternatively, the separator may be located within the housing of a boiler or heater. The separator could, alternatively, be incorporated into part of an air conditioning system.

The magnetic element conveniently comprises a tubular member within which one or more magnets are hermetically sealed. The tubular member preferably has a smooth surface, and the magnets conveniently do not extend to the ends of the tubular member. Such an arrangement allows the removal of the collected ferrous particles from the magnetic element in a simple and convenient manner.

A sleeve, for example of a thin plastics material, may be provided over at least part of the magnetic element. The sleeve is conveniently removable. The provision of a removable sleeve is advantageous in that, when it is desired to remove the particles collected by the separator, the magnetic element and sleeve are removed, together, from the housing. The sleeve is then removed from the magnetic element. On removal of the sleeve, the collected particles located about the sleeve experience a reduction in the degree of magnetic attraction, and fall from the sleeve and can be collected in a suitable container for appropriate disposal. The sleeve may, if desired, be ribbed, but this need not always be the case.

The housing conveniently comprises a housing body with a removable lid. The lid may be securable to the housing body by screw threads, by being a snap fit, by one or more bolts or by any other suitable means. A shut-off mechanism may be provided to close the inlet and outlet when the lid is not fitted to the housing body.

According to another aspect of the invention there is provided an inlet device comprising an externally screw-threaded bolt defining a generally axially extending passage, a valve seating surrounding part of the passage, and a valve member spring biassed towards the seating to close the passage.

In use, the inlet device may be incorporated into, for example, a central heating system. The valve member, when engaging the seating, substantially prevents the escape of fluid from the system. When an inhibitor or other fluid is to be added, a suitable applicator supplies the inhibitor or other fluid to the passage at a sufficient pressure to urge the valve member away from the seating, thereby allowing the inhibitor or other fluid to enter the heating system.

The passage may include a screw-threaded region receiving a plug to seal the passage, and thereby further prevent the escape of fluid from the system when this is not desired. In use, when the inhibitor or another fluid is to be added to the system, the plug can be removed.

The plug is preferably shaped so as to engage and lift the valve member from its seating, when fully introduced into the passage, so that release of the plug by a small amount allows fluid, for example air, to be bled from the system.

The inlet device may be used to secure parts of a separator to one another. Alternatively, it could be mounted in, for example, a radiator. It will be appreciated, however, that the inlet device may be used in other parts of the system.

According to another aspect of the invention there is provided a fluid filled heating and/or cooling system containing a magnetic separator comprising a housing within which a magnetic element is located to separate ferrous particles from the fluid, and an inlet device of the type defined hereinbefore.

The invention will further be described, by way of example, with reference to the accompanying drawings, in which.

Figure 1:
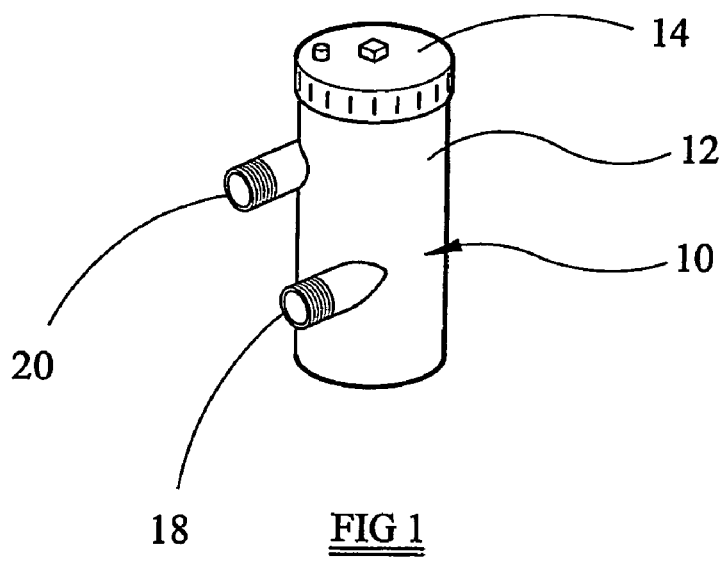
FIG. 1 is an external view of a separator.
Figure 3:
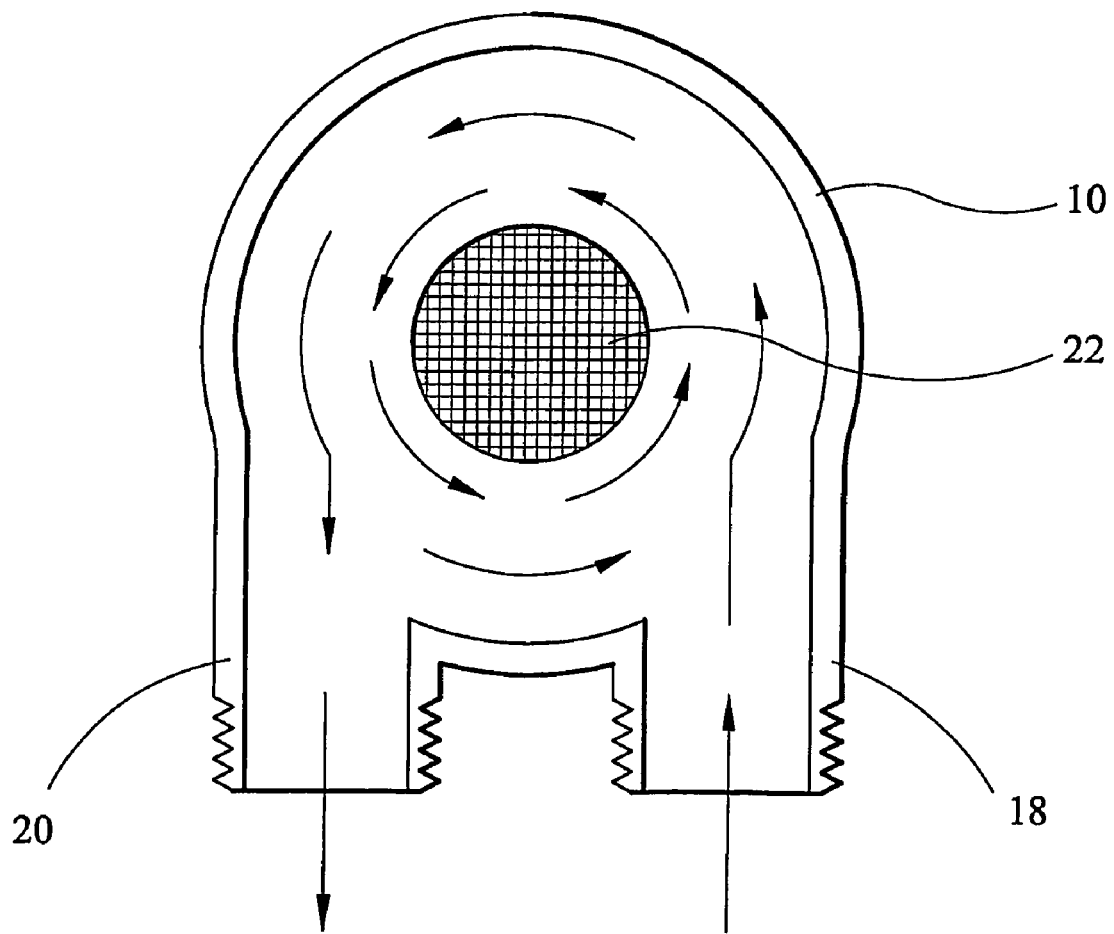
FIG. 3 is another sectional view of the separator.
Figure 2:
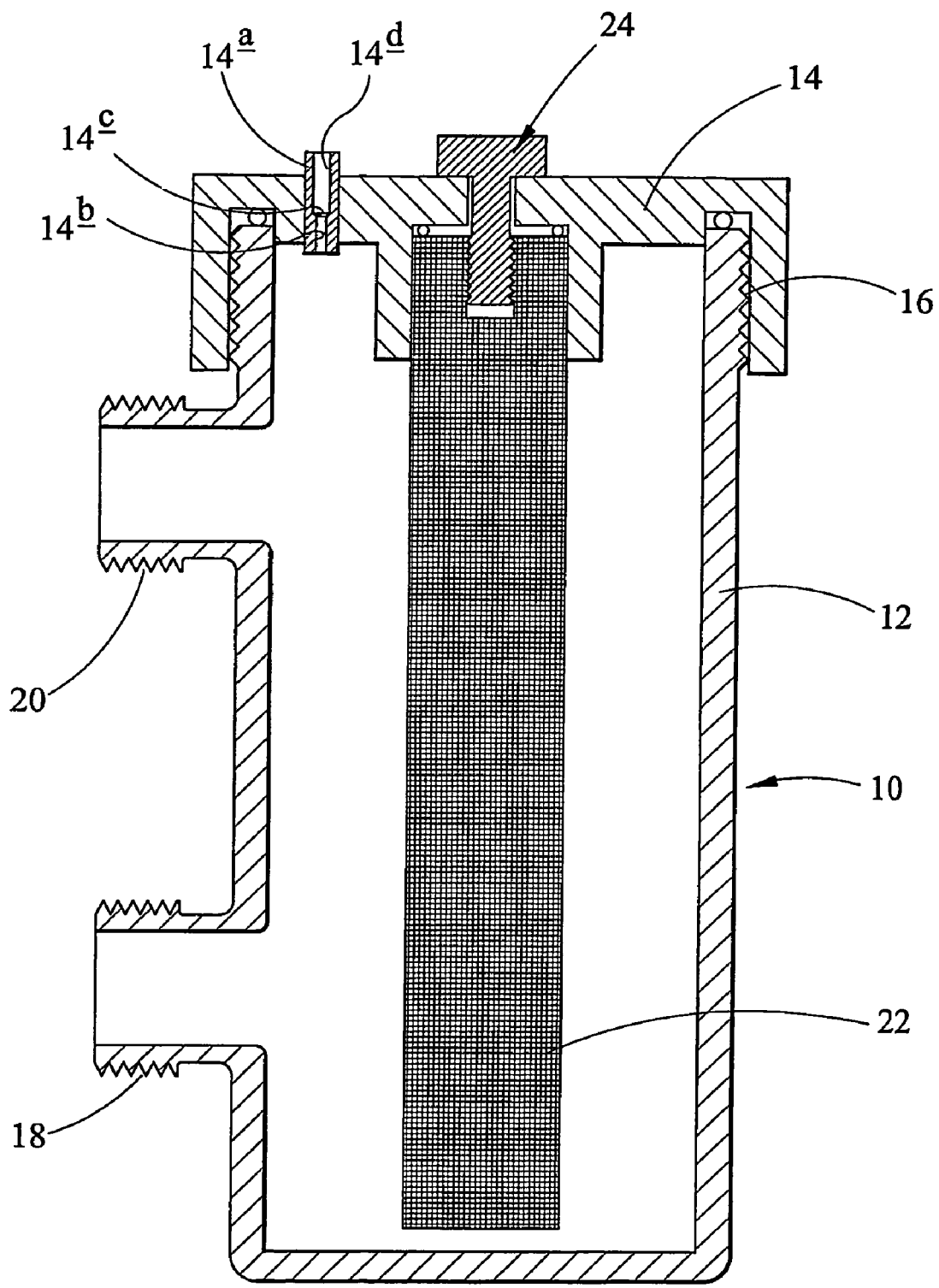
FIG. 2 is a section of the separator.

Referring to FIGS. 1 to 4 of the drawings, a separator comprises a housing 10 which is conveniently of moulded plastics form, but it will be appreciated that this need not be the case and the housing could be manufactured from a metallic material or any other suitable material. The illustrated housing 10 is of generally cylindrical form, but this need not be the case and other shapes of housing are possible. The illustrated separator is intended for use in a heating system, for incorporation into the pipework between a water boiler or heater, for example an electrically powered, oil fired or gas fired boiler, and a series of radiators. As such, it will be appreciated that in use hot water will flow through the housing 10. The material used in the housing 10 should therefore be able to withstand temperatures of up to 100° C. without adverse deformation, although in normal operation the temperature of the water flowing through the housing is unlikely to exceed around 70° C.

As mentioned hereinbefore, the housing 10 is conveniently of generally cylindrical form. The inner surface of the housing is conveniently provided with a smooth finish so as not to form an obstruction to the flow of fluid therethrough. The housing 10 is conveniently in two-part form comprising a main body 12 and a removable lid 14. The lid 14 may be securable to the main body 12 by virtue of screw-threads 16. However, it will be appreciated that other techniques for securing the lid 14 to the main body 12 may be used, if desired. For example the lid could be a snap fit or securable in position using one or more bolts. Further, a mechanism may be provided to close the inlet and outlet (see below) when the lid is not fitted and/or secured in position.

The housing 10 is provided with an inlet 18 and an outlet 20. The inlet and outlet are conveniently integrally formed with the main body 12, but could take the form of separate components secured to the main body 12, if desired. As illustrated, the inlet and outlet 18, 20 are conveniently provided with ¾ inch BSP male threads to allow the housing 10 to be secured using conventional pipe fittings (not shown) to the pipe work located between the boiler and radiators, in use. Preferably, the design of the housing 10 is such that the housing 10 is supported by the connection of the housing 10 to the pipe work. However, it will be appreciated that arrangements are possible in which a separate mounting arrangement is provided to support the housing 10 such that the weight of the separator is not born by the pipe work to which the separator is connected.

Within the housing 10 is provided a magnetic element 22. The magnetic element 22 is conveniently secured, for example using a bolt 24, to the underside of the lid 14, the element 22 extending substantially along the axis of the housing 10. Conveniently, an O-ring is provided to seal the element 22 to the lid 14 to avoid leakage, in use.

Figure 4:
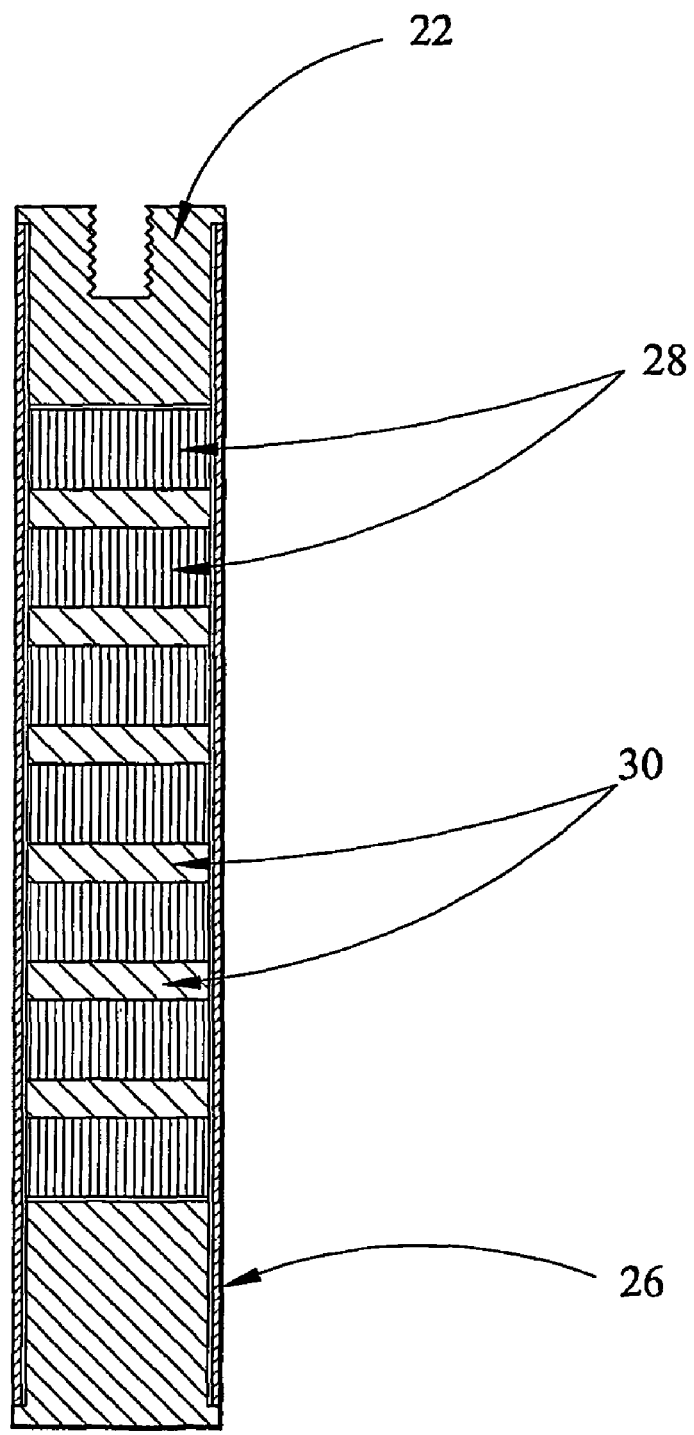
FIG. 4 is a section of a typical magnetic separator rod.

As shown in FIG. 4, the element 22 takes the form of a hollow tubular member 26 within which a number of magnets 28 are located. The ends of the tubular member 26 are closed so as to prevent water passing through the housing 10, in use, coming into contact with the magnets 28. The magnets 28 are evenly spaced along the majority of the length of the tubular member 26 to give a substantially uniform magnetic field. However, the end parts of the tubular member 26 do not contain any magnets with the result that, in use, magnetite will not tend to stick to these parts of the element 22.

The magnets 28 used in the element 22 are short, cylindrical rare earth magnets having opposite poles on their circular faces. These magnets are alternately arranged with short cylindrical (or disc-like) pole extension members 30. The orientation of the magnets also alternates, so that the north and south poles of any magnet faces the north and south poles respectively of its two neighbouring magnets. This core is hermetically sealed in member 26.

The pole extension members 30 direct the flux from each magnet 28 so that generally speaking it leaves the magnetic filter body perpendicular to the filter's axis, before curving around and re-entering the magnetic filter body perpendicularly to complete a magnetic circuit to the magnet's South Pole; The field strength falls rapidly with increasing radial distance, the magnetic flux extending a comparatively short distance. This distance from the magnet or pole extension is often referred to as the 'throw'.

As magnetic particles (by magnetic particles is meant ferrous particles, or other such particles as are attractable by a magnetic field such as paramagnetic particles) in the fluid flow past the magnetic separator rod, the field from the magnetic discs attracts the particles towards the stainless steel outer shell. In this manner (provided the capacity of the magnetic filter has not been exceeded) magnetic particles as small as one micron, or smaller still, may be removed from the fluid. The fluid which may be water, but could easily be any of a number of fluids contaminated with ferrous particles, is in this manner cleansed.

The housing 10 is provided, in its lid 14, with an opening in which an air bleed device 14a is located. The air bleed device 14a is provided with an axially extending, partially internally screw threaded passage 14b defining a seating 14c. An externally threaded plug 14d is located within the passage 14b so as to be engageable with the seating 14c to close the passage 14b.

In use, water enters the housing 10 through the inlet 18, flows over and/or around the element 22 and exits the housing 10 through the outlet 20. As the fluid passes over and/or around the element 22, ferrous particles will be attracted towards and stick to the element 22, separating such particles from the water flow. The ferrous particles build up on the element 22 over time until a point is reached beyond which the magnetic field strength at the edge of the build-up of ferrous particles is insufficient to capture any further particles. As mentioned hereinbefore, even under these circumstances, the housing 10 is conveniently sufficiently large that the separator does not form a restriction to fluid flow.

If it is thought that a build-up of ferrous material has occurred, the lid 14 and element 22 can be removed and the ferrous particles removed from the element 22, for example by wiping with a cloth, before re-assembling the separator for continued operation.

There is a risk that the operation of removing the collected material may introduce a quantity of air into the system in which the separator is located. This air may be removed, after reassembling the housing 10, by slackening the plug 14d to lift it slightly from its seating 14c. Once so lifted, air is able to pass between the plug 14d and the seating 14c, the air passing between the threads of the plug 14d and the passage 14b and escaping into the atmosphere. After bleeding the air from the separator, the plug 14d is tightened against the seating 14c to seal the housing 10.

It will be appreciated that the design of the separator is such that the inlet and outlet connections can be reversed without impairing the operation of the separator.

The spacing of the inlet and outlet in the direction of the axis of the element 22 results in the separator operating with improved efficiency. If desired, the inlet and outlet may be designed such that fluid enters the housing 10 generally tangentially, thereby inducing a swirling motion in the fluid which, again, may improve efficiency.

The arrangement described hereinbefore is intended for use in a heating system. It will be appreciated that, with little or no modification, it could be used in other applications, for example in an air conditioning system. Further, with appropriate modification, the separator could be located within a boiler or water heater. For example, the separator could be retrofitted into the pipework within a boiler. Alternatively it could be incorporated into the boiler design.

GB 2072807, the contents of which are incorporated herein by reference, describes an air bleed device having a float valve. Such a device could be modified in accordance with the invention to include a magnetic element so as to serve, additionally, as a magnetic separator.

Figure 5:
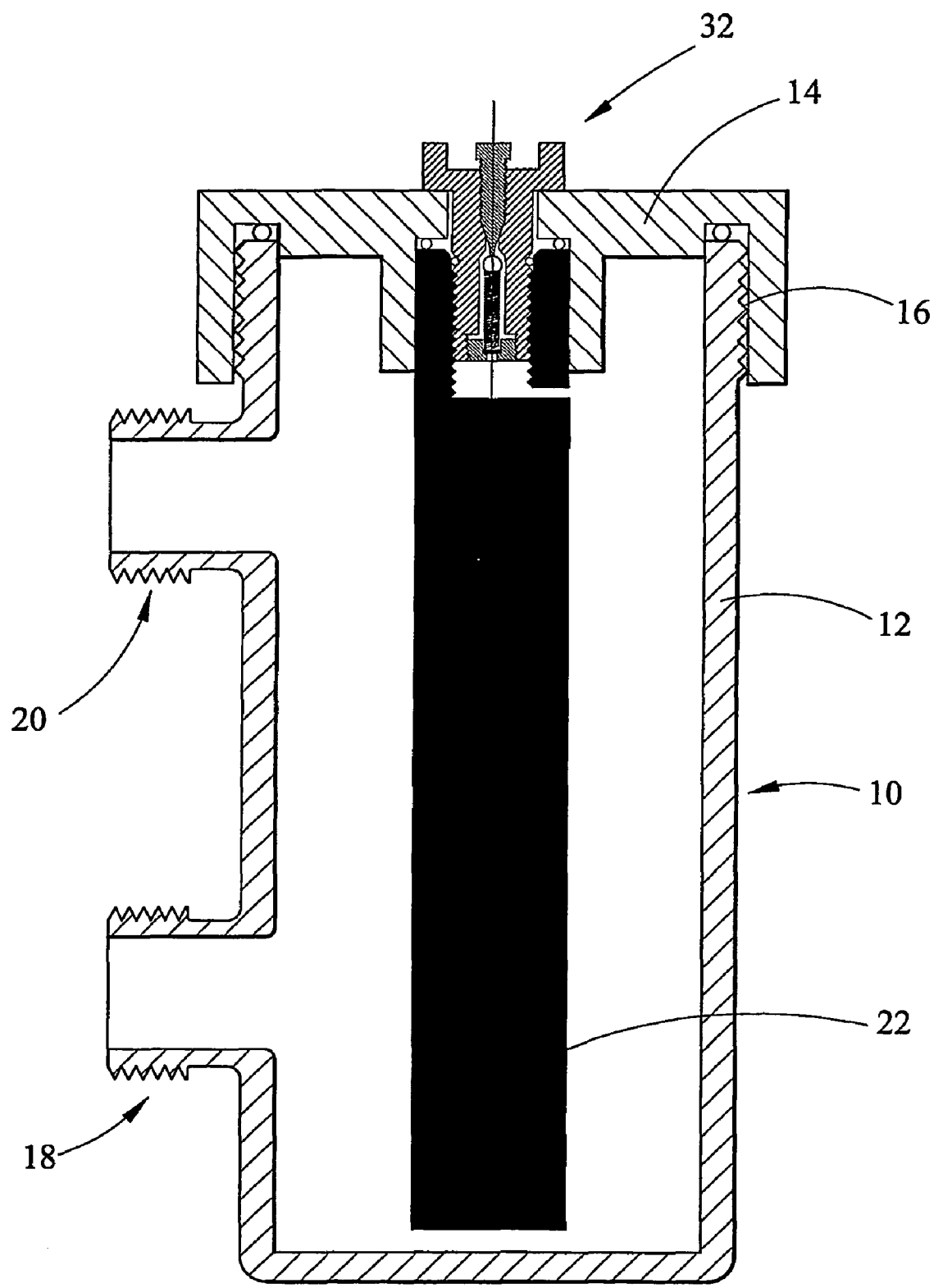
FIG. 5 is a diagrammatic illustration of a separator incorporating an inlet device in accordance with another embodiment of the invention.
Figure 6:
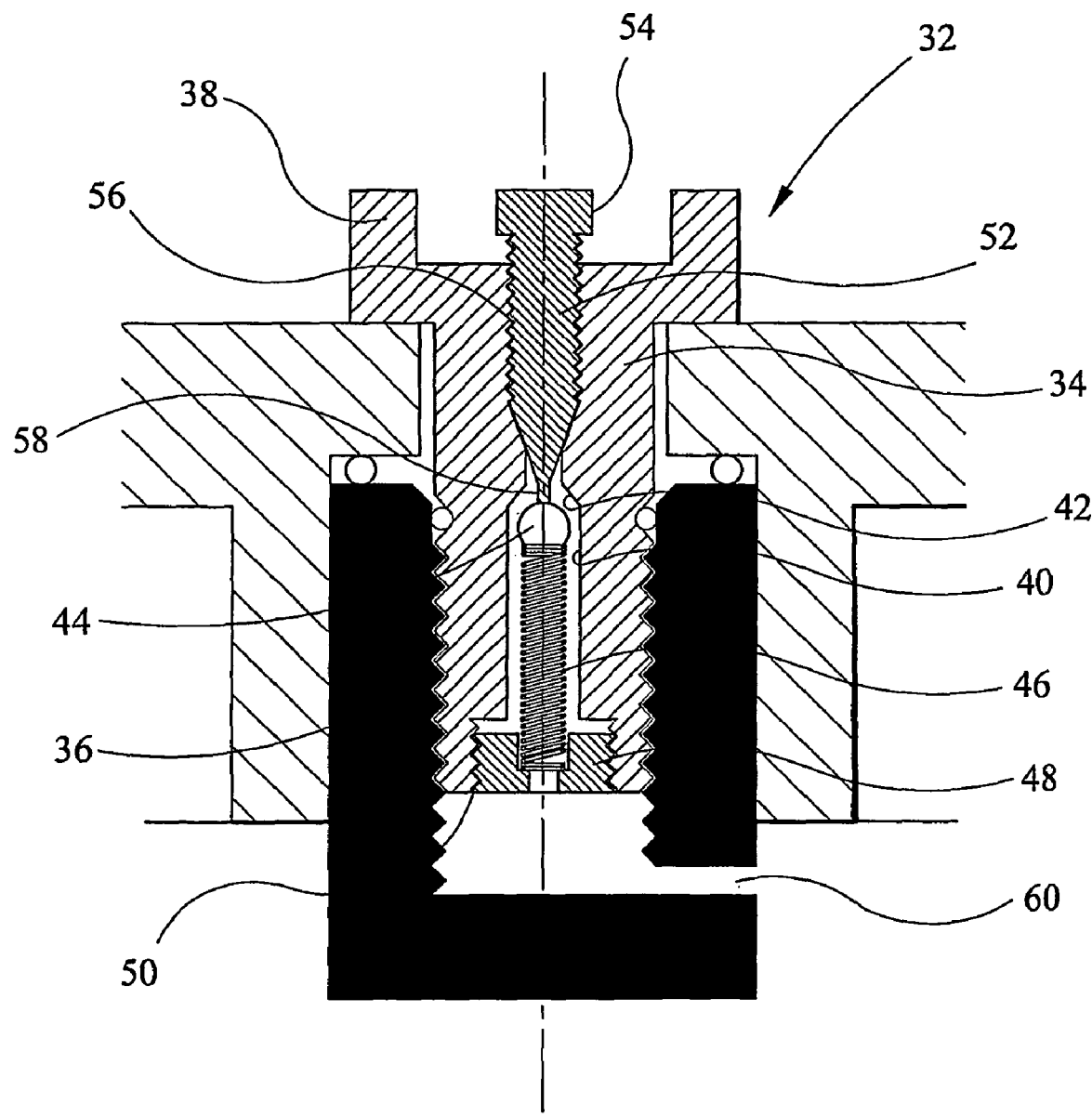
FIG. 6 is an enlargement of part of FIG. 5.

FIGS. 5 and 6 illustrate a separator similar to that described hereinbefore, with all of the advantages and benefits described hereinbefore. In the arrangement described hereinbefore the magnetic element 22 is secured to the lid 14 by a bolt 24. In the arrangement of FIGS. 5 and 6 the bolt 24 is replaced with an inlet device 32 which, in addition to serving to secure the magnetic element 22 to the lid 14, further serves to allow the addition of an inhibitor fluid or other liquid to the system in which the separator is fitted, and allows air or gas to be removed from the system.

As is best shown in FIG. 6, the inlet device 32 comprises an externally screw-threaded bolt 34, part of which is receivable within a correspondingly threaded bore 36 formed in the magnetic element 22 to allow the magnetic element 22 to be secured the lid 14 of the separator. The bolt 34 includes a head 38 shaped to allow the engagement thereof by a spanner or other suitable tool to assist in securing these components to one another.

The bolt 34 is provided with a generally axially extending through passage 40. The passage 40 is shaped to define a generally conical valve seating 42 against which a spherical or generally spherical valve member 44 is engageable. The valve member 44 is urged towards the seating 42 by a coiled spring 46, the spring 46 being seated against a spring seat member 48 which is received within an internally screw-threaded region 50 of the passage 40. Although shown as being secured in position by screw-threads, other techniques could be used to secure the spring seat member 48 in position.

The end of the passage 40 closest to the head 38 is internally screw-threaded, and a screw-threaded plug 52 is received therein. The plug 52 includes a head 54 shaped to allow manipulation of the plug 52 by a suitable tool. The plug 52 includes a face shaped to be engageable with a second seating 56 formed in the passage 40 to close the passage 40. The plug 52 further includes, at an end thereof, a projection 58 engageable with the valve member 44 to lift the valve member 44 away from its seating 42.

The magnetic element 22 is provided with one or more drillings or passages 60 allowing communication between the bore 36 and the interior of the separator housing 10.

In normal use, the separator acts as described hereinbefore with reference to FIGS. 1 to 4 to separate ferrous particles from a fluid. If it is desired to add a liquid additive, for example a corrosion inhibitor, to the fluid, then the plug 52 is removed. The removal of the plug 52 allows the valve member 44 to move into engagement with the seating 42 under the action of the spring 46 and the fluid pressure of the system. Once in this position it will be appreciated that the escape of fluid from the system is prevented or severely restricted by the valve member 44. The additive, in a suitable dispenser, is supplied to the part of the passage 40 from which the plug 52 has been removed, the additive being supplied at a sufficient pressure to lift the valve member 44 from its seating and allow the additive to enter the housing 10 through the remainder of the passage 40, the bore 36 and drilling(s) 60. After addition of the additive, the valve member 44 will again close the passage 40 to avoid or restrict fluid escape from the system. The plug 52 is then re-introduced and tightened against its seating 56 to seal the passage 40. The re-introduction of the plug 52 lifts the valve member 44 from its seating 42.

The inlet device 32 can further be used to bleed air from the system. By slightly loosening the plug 52 to break its seal with the seating 56 but not moving it far enough to allow the valve member 44 to engage its seating 42, fluid can move past the valve member 44 and the plug 52 at a restricted rate. Obviously after bleeding, the plug 52 should be re-tightened against its seating to again seal the system. If desired, the bleed function may be omitted by omitting the projection 58 from the plug 52.

In the arrangements described hereinbefore, upon removal of the magnetic element from the housing, it is wiped to remove collected particles therefrom. It is envisaged to provide a sleeve for the magnetic element, for example of a thin plastics material, the sleeve being removable from the magnetic element. The use of, for example, a thin plastics material is thought to be advantageous in that it will have relatively little impact upon the magnetic field, in use. When the magnetic element is removed from the housing for cleaning, it is thought that the action of subsequently withdrawing the magnetic element from the sleeve will result in the collected particles surrounding the sleeve no longer being held in position by the magnetic attraction of the magnetic element, and as a result the particles will fall from the sleeve and can be collected in a suitable container, for example for disposal. The sleeve could, if desired, be ribbed.

Although the inlet device 32 is described hereinbefore in association with a separator, it may be used or fitted elsewhere in the system. For example, it could be fitted or mounted on a radiator, possibly as a substitute for the conventional air bleed device typically mounted thereto. It could alternatively be located elsewhere in the system.

A number of other modifications or alterations are possible within the scope of the invention.

The invention claimed is:

1. An inlet device comprising:
   an externally screw-threaded bolt defining a generally axially extending passage,
   a valve seating surrounding part of the passage,
   a valve member which is spring biased towards the valve seating to close the passage, wherein the passage includes a screw-threaded region receiving a plug to seal the passage and thereby further prevent the escape of fluid along the passage when this is not desired, the plug having a projection shaped so as to engage and lift the valve member from the valve seating when the plug is fully introduced into the passage and,
   a separator device comprising a housing having an inlet and an outlet, and a magnetic element located within the housing to collect and seperate from a flow of fluid through the housing ferrous particles carried by the fluid, wherein inlet device is disposed in the housing as an air bleed for the housing.

2. The inlet device according to claim 1, wherein the passage includes a second seating, an wherein the plug includes a face shaped to be engageable with the second seating to further seal the passage.

* * * * *